(12) United States Patent
Gleason et al.

(10) Patent No.: US 8,132,280 B2
(45) Date of Patent: Mar. 13, 2012

(54) LOADING DOCK LEVELER WITH LIP EXTENSION MECHANISM

(75) Inventors: Denis Gleason, Bowmanville (CA); Andrew Barrett, Bowmanville (CA)

(73) Assignee: Nordock, Inc., Bowmanville, Ontario (CA)

( * ) Notice: Subject to any disclaimer, the term of this patent is extended or adjusted under 35 U.S.C. 154(b) by 443 days.

(21) Appl. No.: 12/462,830

(22) Filed: Aug. 10, 2009

(65) Prior Publication Data

US 2010/0031457 A1    Feb. 11, 2010

Related U.S. Application Data

(60) Provisional application No. 61/188,354, filed on Aug. 8, 2008.

(51) Int. Cl.
*E01D 1/00* (2006.01)
(52) U.S. Cl. .......................................................... 14/71.3
(58) Field of Classification Search .................. 14/71.1, 14/71.3, 71.5, 69.5, 71.7
See application file for complete search history.

(56) References Cited

U.S. PATENT DOCUMENTS

| | | | |
|---|---|---|---|
| 3,137,017 A | 6/1964 | Pfleger | |
| 3,323,158 A * | 6/1967 | Loomis | 14/71.3 |
| 3,454,974 A * | 7/1969 | Kumpolt | 14/71.3 |
| 3,579,696 A | 5/1971 | Hecker, Jr. | |
| 3,662,416 A | 5/1972 | Brooks | |
| 3,858,264 A * | 1/1975 | Kuhns et al. | 14/71.3 |
| 3,997,932 A | 12/1976 | Artzberger | |
| RE30,104 E * | 10/1979 | Burnham | 14/71.3 |
| 4,398,315 A | 8/1983 | Driear | |
| 5,088,143 A * | 2/1992 | Alexander | 14/69.5 |
| 5,323,503 A * | 6/1994 | Springer | 14/71.3 |
| 5,475,888 A | 12/1995 | Massey | |
| 5,586,356 A | 12/1996 | Alexander | |
| 5,832,554 A | 11/1998 | Alexander | |
| 6,769,149 B2 * | 8/2004 | Alexander | 14/71.3 |
| 6,834,409 B2 | 12/2004 | Gleason | |
| 6,880,301 B2 * | 4/2005 | Hahn et al. | 52/173.1 |
| 7,013,519 B2 | 3/2006 | Gleason | |
| 7,603,733 B2 * | 10/2009 | Laverman et al. | 14/71.3 |
| 2005/0273949 A1 * | 12/2005 | Gleason | 14/71.3 |
| 2011/0047725 A1 * | 3/2011 | Story et al. | 14/71.3 |

FOREIGN PATENT DOCUMENTS

CA    2056907    5/1992

* cited by examiner

*Primary Examiner* — Thomas Will
*Assistant Examiner* — Abigail A Risic
(74) *Attorney, Agent, or Firm* — Jeffrey S. Sokol

(57) ABSTRACT

A dock leveler with a deck and an extendable lip that hangs pendant when the deck is in a stored position. A lip extension mechanism engages when the deck is raised to a raised or cocked position. As the deck is lowered to an intermediate transition position, the extension mechanism extends the lip to a fully extended position. At the transition position, the lip extension mechanism automatically disengages and a lip locking mechanism automatically and simultaneously locks and holds the lip in its fully extended position. When the deck is further lowered so that the lip comes to rest on a truck trailer, the locking mechanism automatically released or unlocked. The lip returns to its pendant position when the deck is raised from the truck bed. After the truck pulls away from the dock, the deck is lowered to its stored position.

14 Claims, 13 Drawing Sheets

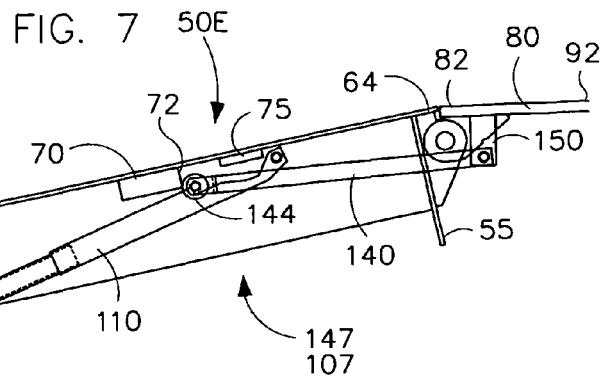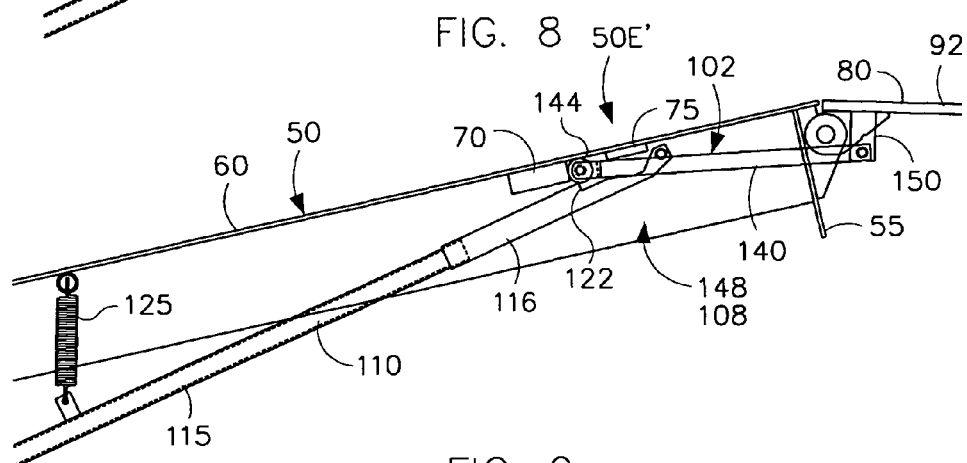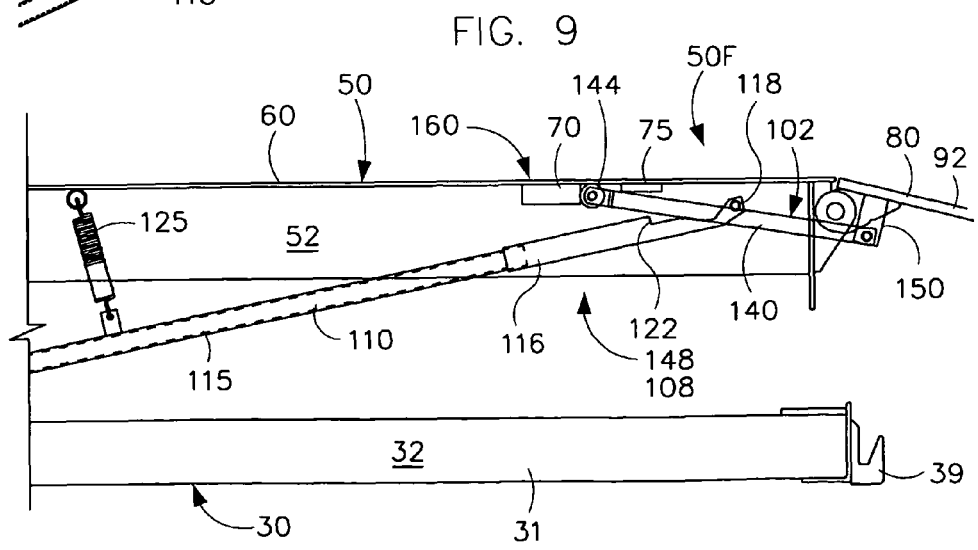

LOADING DOCK LEVELER WITH LIP EXTENSION MECHANISM

This application seeks priority on U.S. Provisional Application No. 61/188,354 filed Aug. 8, 2008.

TECHNICAL FIELD OF THE INVENTION

This invention relates to a loading dock leveler with cooperating lip extension and lip locking mechanisms that extend, hold and release its lip during operation.

BACKGROUND OF THE INVENTION

Dock levelers are used to transfer goods between a building and a truck trailer. Dock levelers bridge the gap between the building floor to the bed of the trailer or similar carrier. Dock levelers include a frame or support structure for mounting the leveler in a pit of a loading dock. The rear end of a conventional dock leveler is hinged to the building floor. The opposite end has an extendable lip plate that pivots out and onto the trailer bed. Levelers are adapted to move from a generally horizontal position where the upper surface of the deck is flush with the surface of the building floor to a second generally inclined position to provide a ramp between the bed of the truck and the dock floor.

Various mechanisms have been developed for extending and retracting the lip of the deck of a loading dock leveler during operation. The lip pivots from a hanging or pendant position to an extended position when the ramp is rising or when the operator walks the ramp down. The lip is typically extended by an actuator and held in its extended position by another mechanism. Examples of such lip extension mechanisms are disclosed in U.S. Pat. Nos. 3,137,017 to Pfleger, 3,997,932 to Artzberger, 4,398,315 to Driear, 5,475,888 to Massey, and 6,834,409 and 7,013,519 to Gleason, the disclosures of which are incorporated by reference herein.

A problem with conventional dock levelers is that the wider, longer or thicker the lip, the harder it is to extend and hold the lip in position. A loaded spring is typically used to assist in extending the lip. Although the assist spring is loaded at all times, the available force of the assist spring is contained when the lip is in its pendant or parked position. The assist spring typically does not start to work until the dock leveler is raised and the lip has already begun to extend. This loss of effective power occurs at the start of its extension, when the assist spring is needed most. Yet, increasing the tension or force of the assist springs makes it harder to walk the unit down.

Another problem with conventional dock levelers is that they tend to lose their ability to fully extend their lip. The lip extension mechanism begins to fail due to wear and other environmental considerations, a lack of lubrication or spring fatigue. Instead of latching and holding in an outward position, the lip tends to fall back to its pendant position. The leveler remains inoperative until proper lip extension is restored by periodic preventive maintenance or adjustment of the springs. Even a short outage can be significant given that these devices typically operate in a heavy industrial context.

Other levelers replace the mechanical latch with a hydraulic damper that permits the lip to be extended freely but restrict its retraction. Even if the lip is not fully extended, the damper will retard its retraction long enough for the operator to walk the leveler down to the truck bed. Hydraulic dampers also quickly retract under high load, which can protect the lip mechanism from damage when the lip is accidentally struck by a truck that backs into the lip while still extended. Still, hydraulic dampers have two significant drawbacks. First, the damper begins to retract as soon as the load is applied, and the operator must walk the leveler down immediately. Second, the viscosity of the hydraulic fluid is sensitive to changes in temperature. In warm temperatures, the lip falls too quickly for it to come to rest on the truck bed. In cold temperatures, the lip falls too slowly when the leveler is removed from the truck.

A further problem with conventional dock levelers is that the lip extension mechanism is complex and includes many components. One mechanism extends the lip, a different mechanism holds the lip extended, and a still further mechanism releases the lip so it can return to its stored position. These mechanisms and their various components increase the cost to manufacture, assemble and maintain the machine. These various mechanisms and components also tend to decrease the range of motion of the leveler. The leveler cannot be raised or lowered beyond certain upper and lower limits because of the tight or cramped arrangement of the many moving parts.

The present invention is intended to solve these and other problems.

BRIEF DESCRIPTION OF THE INVENTION

The present invention pertains to a dock leveler with a deck and an extendable lip that hangs pendant when the deck is in a stored position. A lip extension mechanism engages when the deck is raised to a raised or cocked position. As the deck is lowered to an intermediate transition position, the extension mechanism extends the lip to a fully extended position. At the transition position, the lip extension mechanism automatically disengages and a lip locking mechanism automatically and simultaneously locks and holds the lip in its lip fully extended position. When the deck is further lowered so that the lip comes to rest on a truck trailer, the locking mechanism is automatically released or unlocked. The lip returns to its pendant position when the deck is raised from the truck bed. After the truck pulls away from the dock, the deck is lowered to its stored position.

An advantage of the present dock leveler is the power of its lip extension mechanism. The extension mechanism can easily extend and hold the heavier, more durable lips in use today. The lip is extended by substantially linearly aligned rigid metal drive components that engage when the deck is raised to a predetermined inclined position. Although a spring helps align these components, the spring does not generate the force to extend the lip. This power of the extension mechanism remains relatively constant as the lip is extended, including at the start of the lip extension when that power is needed most.

Another advantage of the present dock leveler is the inventive geometric arrangement of its components to create differing relative motions and the use of gravity to engage and disengage the lip extension mechanism. The geometric configuration of the components and use of gravity also transition the lip extension mechanism into a locking mechanism. This transition automatically occurs as the lip reaches its fully extended position, and the locking mechanism simultaneously engages to lock and hold the lip in its fully extended position as the deck continues to be lowered into engagement with the truck trailer. The engagement with the truck trailer automatically disengages or unlocks the locking mechanism so that the lip will return to its pendant position under its own weight. Maintenance requirements are reduced as the rigid metal drive components are not prone to fail due to wear, environmental considerations, a lack of lubrication or spring fatigue. Springs, mechanical latches, dampers and the like are not used to hold the lip in its extended position.

A further advantage of the present dock leveler is its reduced number of components. The same components that combine to extend the lip are used to form the locking mechanism that holds the lip extended, and allows the locking mechanism to release when the lip engages the truck trailer. Its geometric design and relatively few components decrease manufacture, assembly and maintain costs. This design also allows the compact leveler to move through a wide range of motion.

Other aspects and advantages of the invention will become apparent upon making reference to the specification, claims and drawings.

BRIEF DESCRIPTION OF THE DRAWINGS

FIG. 7 is a side view showing the deck and lip assembly lowered to transition position 50E with the lip extension mechanism 100 still engaged 107 (pre-transition), with the lip drive components 110, 140 and 150 moved further forward to rotate the lip to its fully extended position 92, and with the drive abutment 122 and roller pin 145 located slightly in front of the lock block 70 so that the roller 144 just clears the lock block.

FIG. 8 is a side view showing the deck and lip assembly in transition position 50E' with the lip extension mechanism 100 disengaged 106 as the roller pin 145 disengages from abutment 122, and with the locking mechanism 102 engaged or locked 108 as the roller 144 moves into locked engagement with a lock block 70 (post transition) to hold the lip in its fully extended position 92.

FIG. 9 is a side view showing the deck and lip assembly in a further lowered position 50F with the lip locking mechanism 102 locked 108 and the lip fully extended 92.

DESCRIPTION OF THE PREFERRED EMBODIMENTS

While this invention is susceptible of embodiments in many different forms, the drawings show and the specification describes in detail preferred embodiments of the invention. It should be understood that the drawings and specification are to be considered an exemplification of the principles of the invention. They are not intended to limit the broad aspects of the invention to the embodiments illustrated.

Figure 1:
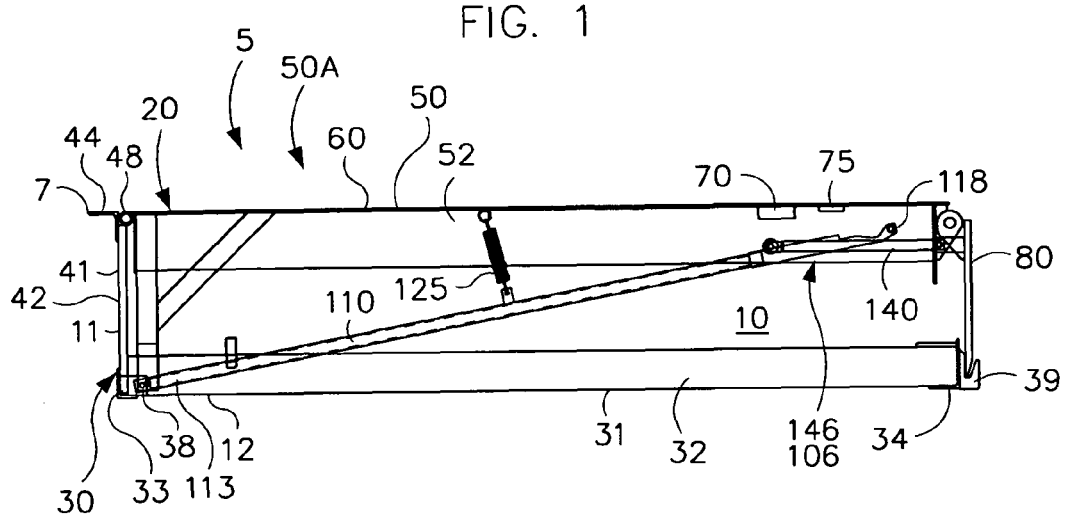
FIG. 1 is a side view of the dock leveler 20 showing the mounting frame 30 in a loading dock pit with the deck and lip assembly 50 in its parked position 50A and the lip extension mechanism disengaged 106.

Loading docks 5 have generally flat, horizontal, elevated floor surface 7 and a generally vertical front wall. The loading dock 5 has a pit 10 of sufficient depth to house a dock leveler as shown in FIG. 1. The pit 10 has a rear wall or surface 11, a bottom floor or surface 12, opposed sidewalls or surfaces, and an open front. The floor 12 of the pit 10 is generally horizontal or slightly sloped for drainage, and is spaced a desired distance from the floor 7 of the loading dock 5. The walls 11 are generally vertical and normal to floor surfaces 7 and 12. The loading dock building and doorways can be set back or aligned flush with the front wall of the loading dock 5. For example, an overhead door can be positioned directly above the dock leveler toward the open front end of the pit 10.

Figure 10:
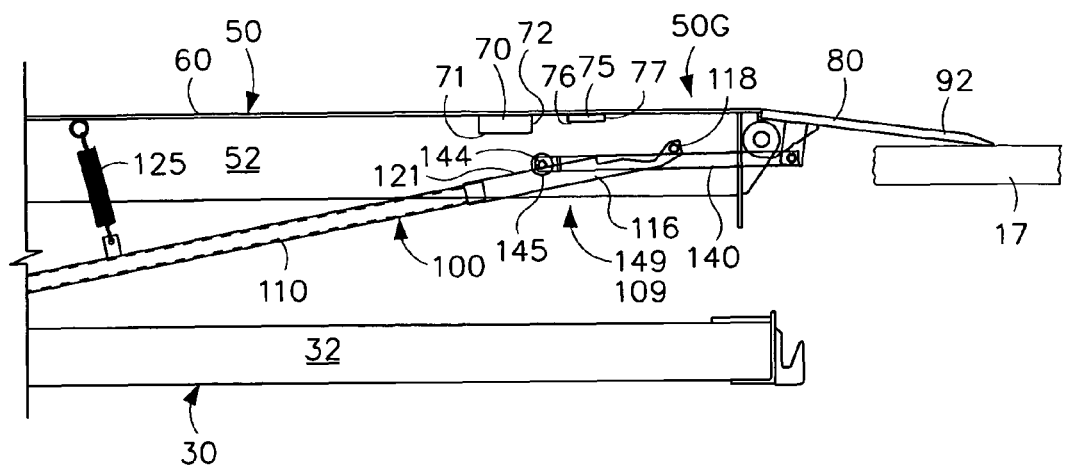
FIG. 10 is a side view showing the deck and lip assembly in lowered position 50G with the extended lip resting on a truck trailer, with the locking mechanism 102 unlocked 109 as forced locked engagement between drive rod 140 and lock block 70 is released, and with the extension mechanism 100 disengaged 106 as the roller pin 145 rests on the actuation bar 110 at a location rearward abutment 122.

The loading dock 5 is designed to facilitate access to a trailer of a truck or other carrier. The trailer has a bed 17 upon which cargo items are placed for transport as shown in FIG. 10. The trailer bed 17 is spaced above the road or surface on which the trailer is traveling, and the floor 7 of the loading dock 5 is spaced a desired distance from its adjacent driveway or approach so that a trailer bed 17 is somewhat near the level of the dock floor 7 when the rear end of the trailer is backed up to the front of the dock. The floor 12 of the pit 10 is elevated a desired height above the driveway, but could be even with or lower than the driveway depending on the particular circumstance without departing from the broad aspects of the invention. The height of the trailer bed 17 relative to the dock floor 7 depends on a variety of factors that include the particular trailer involved and the weight of the item or items on the trailer. The trailer bed 17 rises and falls relative to the floor 7 as items are placed on or removed from the trailer.

The present invention relates to a dock leveler generally indicated by reference number 20 and shown in FIG. 1. The dock leveler 20 has a variety of components including a mounting frame 30, a deck and lip assembly 50 with a deck 60 and an extendable lip 80, a deck lift assembly (not shown) and a lip extension mechanism 100 that transitions into a lip locking mechanism 102. The components are robustly designed to support the weight of the deck and lip assembly 50 and the loads it is intended to carry when fork lifts and the like carry cargo items over the leveler 20. The components are generally made of industrial grade steel or materials of similar strength and durability. The components may be painted, coated or otherwise treated to inhibit rust or corrosion.

The mounting frame assembly 30 is located along the floor 12 and rear wall 11 of the pit 10. The frame assembly 30 has front and rear ends, and includes a generally horizontal base frame or platform 31 that is bolted or otherwise rigidly anchored to the floor 12, and a generally vertical riser frame 41 that is similarly anchored to the rear wall 11. The base frame 31 spans the length of the assembly 30, and includes two spaced apart, generally parallel side beams 32 that are rigidly joined by a rear mounting channel located at the rear end of the base frame. The base frame 31 also includes two forward mounting channels 34 located at its front end. The mounting channels 33 and 34 are rigidly anchored to the floor 12 of the pit 10, and the side beams 32 are welded, bolted or otherwise rigidly secured to the mounts 33 and 34. Pivot brackets 38 are fixed proximal the rear of the base frame 31 near the pit floor 12. A lip support 39 is rigidly fixed to the front surface of each front mount 34.

The riser 41 is located along the rear wall 11 of the pit 10, and is preferably welded or otherwise rigidly secured to the rear end of the base frame 31. The riser 41 includes two or more vertical beams joined together by an upper mounting channel 44 and the rear mount 33 of the base frame 31. The two outer risers 42 are aligned with the side beams 32. The bottom ends of each riser 42 are rigidly secured to the rear end of its respective side beam 32 or to the rear mount 33. The mounting channel 44 is aligned against and anchored to one or both of the top of the rear wall 11 and the floor 7 of the loading dock 5. The risers 42 are rigidly secured to the upper mount 44 to firmly support a fixed tubular hinge or pivot mount 48 for pivotally supporting the deck assembly 50. The frame 30 is preferably permanently attached to cast in steel in the building floor at its rear pivot end.

The deck and lip assembly 50 includes a support frame 51 and a deck 60. The assembly 50 and deck 60 are movable through a range of inclined positions between raised and lowered positions as discussed below. The frame 51 has six evenly spaced, parallel beams 52 and side plates joined together by a rear plate 54 and a header plate 55. The front and rear ends of each beam 52 are welded or otherwise rigidly secured to the inside surface of plates 54 and 55. The top of the outside or rear surface of the rear plate 54 is firmly and pivotally secured to the hinge 48 at the top of the risers 42 of the support frame 30. The plate 55 is aligned parallel to and offset a slight distance rearwardly from the front edge 64 of the deck 60. The front surface of the plate 55 has a set of evenly spaced lugs 59.

The deck 60 is preferably a sheet or plate of metal. The deck 60 has a predetermined length of preferably about 6-10 feet between its parallel rear and front ends 62 and 64. The rear end 62 is flushly aligned with the rear plate 54, and its front end 64 extends slightly beyond the header plate 55. The deck 60 has a predetermined width. The deck 60 has a predetermined thickness defined by its parallel lower and upper surfaces 66 and 67. The lower surface 66 is welded or otherwise rigidly secured to the frame 51, and its upper surface 67 is generally flat and free and clear of obstructions. The rear end 62 of deck assembly 50 is pivotally secured to hinge 48 so that the upper surface 67 of the deck is parallel to the deck floor 7 when the deck assembly is in its home or parked position 50A as in FIGS. 1 and 3.

The deck 60 has a lock block 70 and an unlock block 75. The blocks 70 and 75 are preferably made of metal and are welded or otherwise rigidly fixed to its underside 66 of the deck. The blocks 70 and 75 are positioned between the midsection and front end 64 of the deck 60. The lock block 70 is positioned and structured to selectively engage and releasably hold the roller of the drive rod as discussed below. The lock block 70 has a flat lower surface 71, and a length of about 3.5 inches between its front 72 and rear 73 walls. Rear wall 73 is preferably about 21 inches from the front end 64 of the deck 60, and its lower surface 71 is preferably about two inch from the lower surface 66 of the deck. The unlock block 75 is positioned and structured to engage the clevis pin of the actuation bar as discussed below. The unlock block 75 has a flat lower surface 76, and a length of about 1.75 inches between its front 76 rear 77 walls. The unlock block 75 is spaced from and located directly between the lock block 70 and header plat 55 of the deck 60, and its lower surface 76 is shorter in height than the lock block 70 and preferably about ½ to one inch from the lower surface 66 of the deck.

The deck assembly 50 includes the extendable lip 80 that has a generally rectangular plate shape, and is hingably or otherwise pivotally secured to the header plate 55. The length of the lip 80 is defined by its parallel inner or hinged end 82 and its outer or free end 84. The width of the lip 80 is defined by its parallel side edges aligned with the side edges of the deck 60. The thickness of the lip plate 60 is defined by its generally parallel lower and upper surfaces 86 and 87. The upper surface 87 is slightly sloped toward the lower surface 86 near outer end 84. The lower surface 86 of the lip plate 80 has a number of lugs 88 located along its hinged inner end 82. Each lug 88 is aligned to flushly engage one corresponding lug 58 of the header plate 55. The header and lip lugs 58 and 88 have linearly aligned holes to receive a pivot rod 89 that pivotally connects the lip 80 to the deck 60. The lip 80 is adapted to move between a pendant or hanging position 91 as in FIGS. 3-5, and a fully extended position 92 as in FIGS. 7-11, or any intermediate or partially extended positions 93 there between such as in FIG. 6. The lip 80 is biased into its hanging position 91 by its own weight. When in its hanging position 91, the lip 80 is generally parallel to the header plate 55 and normal to the deck 60. When lifted to its fully extended position 92, the lip 80 is generally parallel to the deck 60. When fully extended 92, the hinged end 82 of the lip 80 comes close to the front end 64 of the deck 60 to form a slight 0.15 inch gap.

The dock leveler 20 includes a conventional deck lift mechanism (not shown) for raising and lowering the deck and lip assembly 50 through a range of positions 50A-50J. The deck lift mechanism can be a hydraulic or air-bag design or a spring activated design such as in U.S. Pat. Nos. 6,834,409 and 7,013,519, the disclosures of which are incorporated by reference. The deck lift assembly moves the deck and lip assembly 50 between upper and lower positions by pivoting or rotating the deck 60 up or down about hinge 48.

Figure 3:
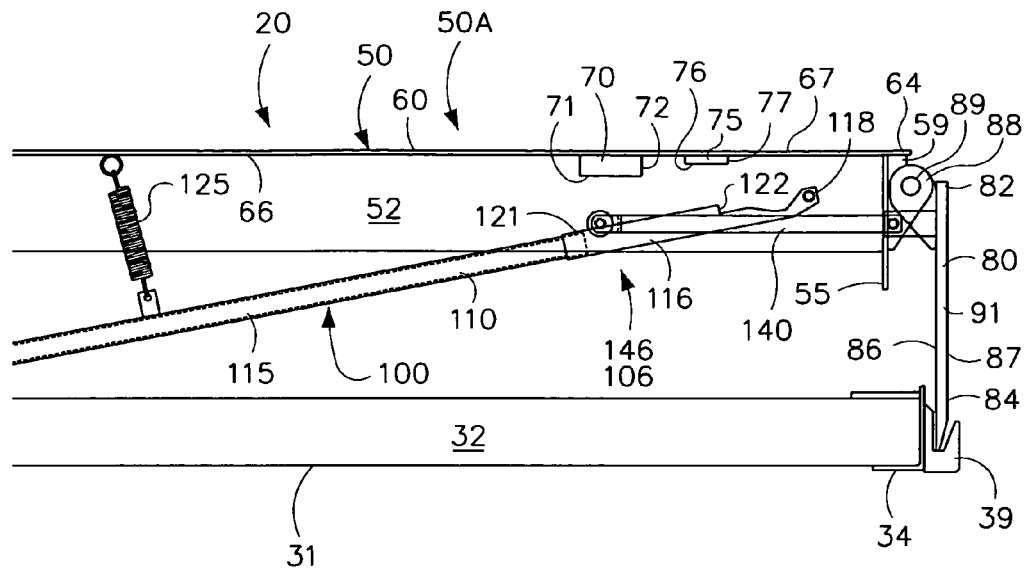
FIG. 3 is an enlarged side view of FIG. 1 showing the deck and lip assembly in its parked position 50A and the lip extension mechanism 100 disengaged 106.
Figure 4:
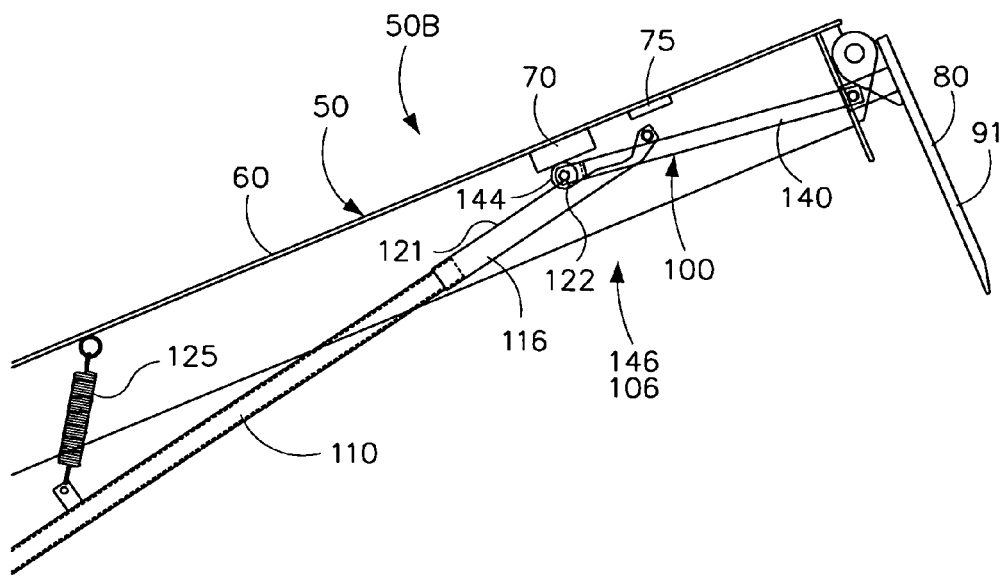
FIG. 4 is a side view showing the deck and lip assembly partially raised 50B, the lip extension mechanism 100 disengaged 106 and the lip hanging pendant 91.
Figure 5:
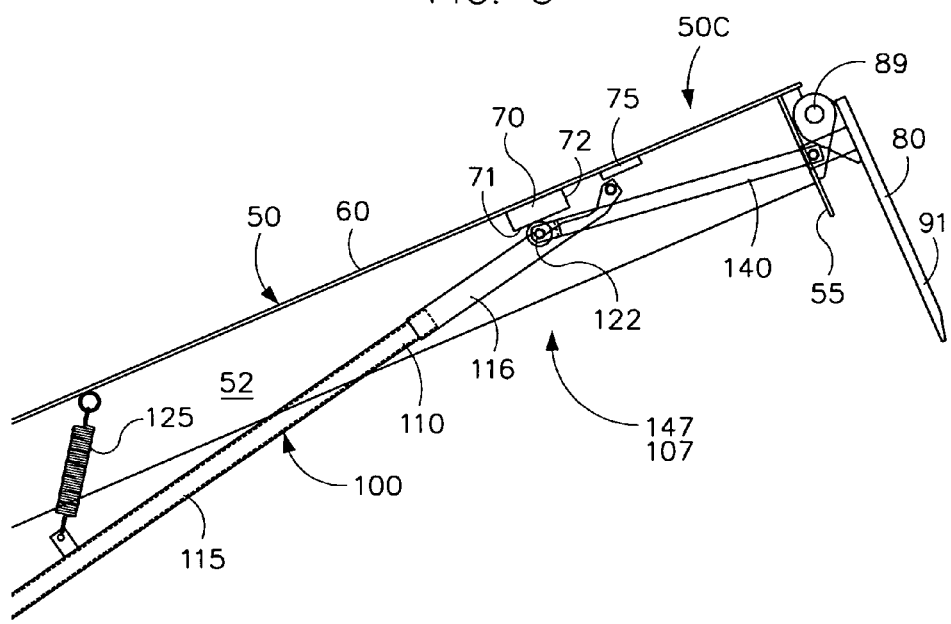
FIG. 5 is a side view showing the deck and lip assembly sufficiently raised 50C to draw back the lip actuation bar 110 until the roller pin 145 drops down at drive abutment 122 to engage 107 the lip extension mechanism while the lip hangs pendant 91.
Figure 11:
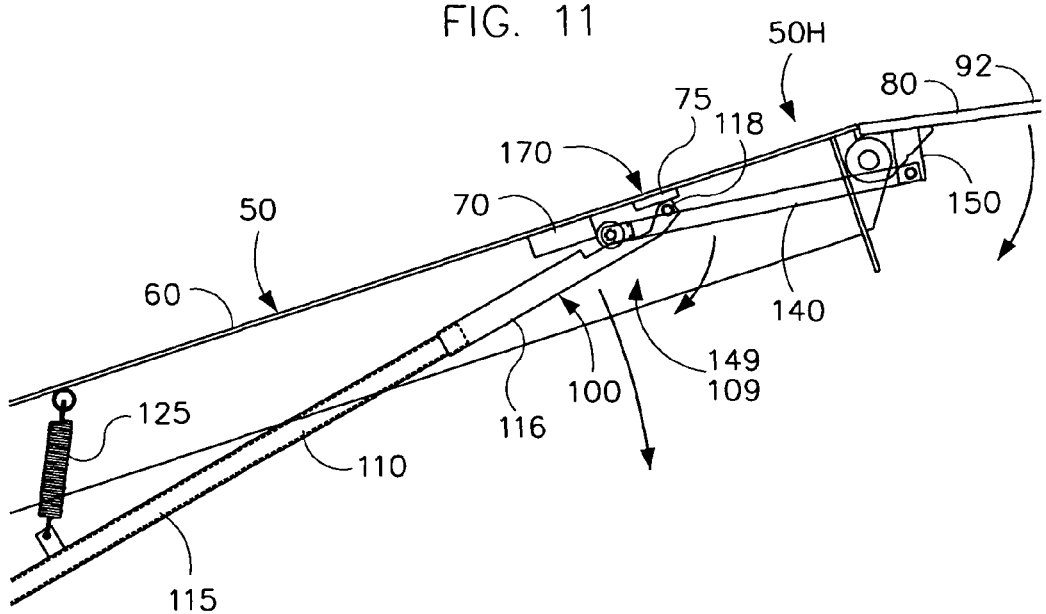
FIG. 11 is a side view showing the deck and lip assembly re-raised 50H with the lip fully extended 92 and the lip locking mechanism 102 moving to an unlocked position 109 due to the clevis pin 118 engaging the unlock block 75 and pushing the drive rod 140 and roller 144 down and out of engagement with the lock block 70.
Figure 12:
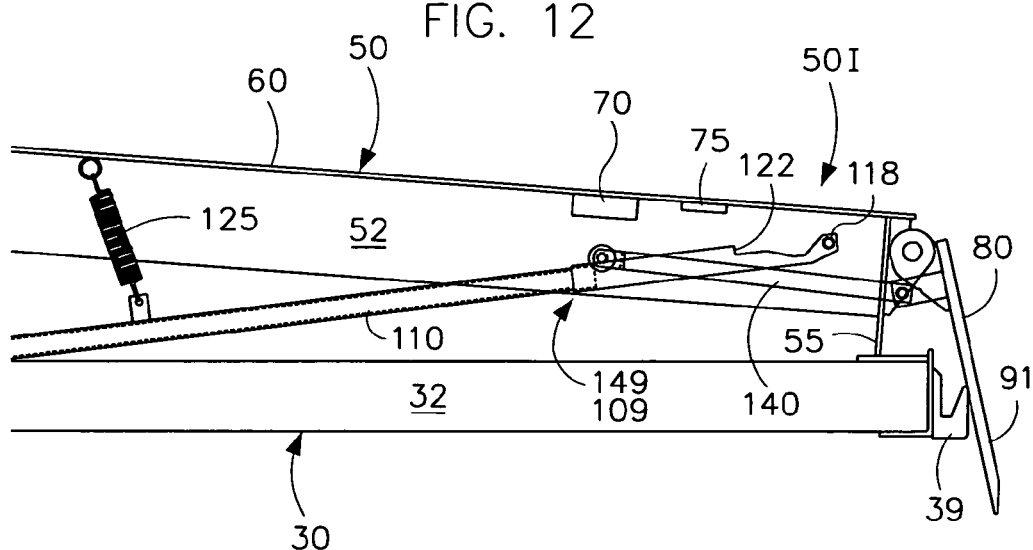
FIG. 12 is a side view showing the deck and lip assembly at its lower limit of motion 50I with the header plate 55 engaging and bottoming out against support frame 30.
Figure 13:
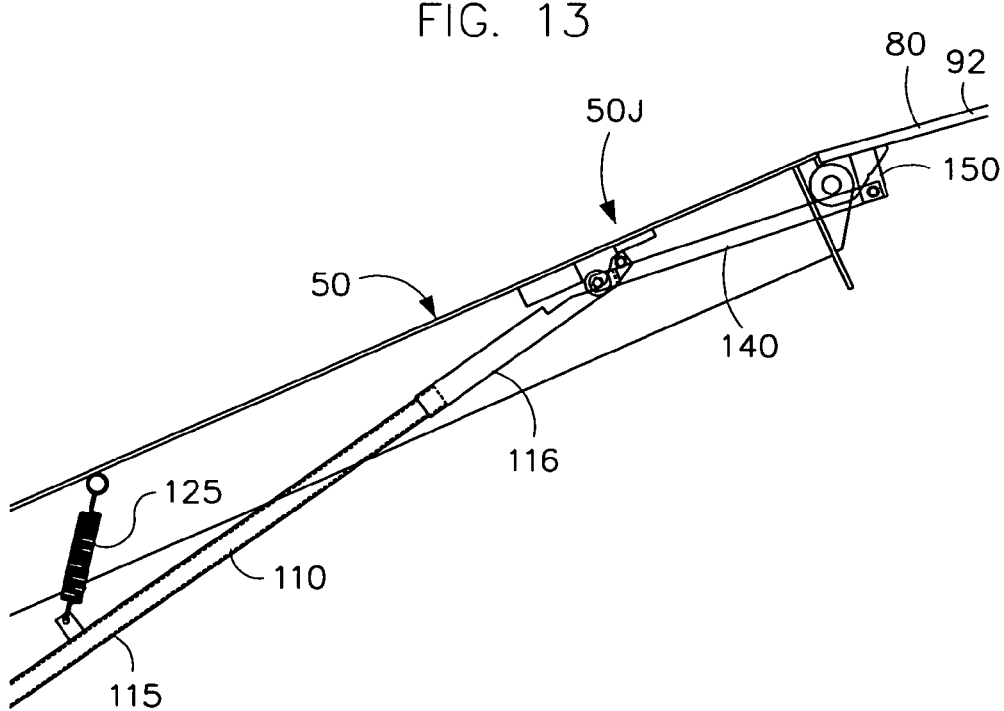
FIG. 13 is a side view showing the deck and lip assembly at its upper limit of motion 50J with the lip extension mechanism components 110, 140 and 150 fully extended and the clevis pin 118 engaging roller 144 to prevent the deck from rising any further.

The deck and lip assembly 50 moves sequentially through a series of rising and then lowering positions to engage a trailer bed 7. The deck 60 starts from a parked position 50A with the deck flush with the dock floor 7 and the lip 80 hanging pendant 91 (FIG. 3). The deck 60 is raised through a partially raised position 50B (FIG. 4) to a sufficiently raised or cocked position 50C (FIG. 5). The deck 60 is then lowered through two about equidistant lowering stages. During the first stage, the deck 60 is lowered though intermediate position 50D with the lip partially extended (FIG. 6) to a transition position 50E and 50E' where the lip is fully extended 92. (FIGS. 7 and 8). During the second stage, the deck 60 continues through intermediate position 50F with the lip locked and fully extended 92 (FIG. 9) to a bridge forming position 50G where the lip 80 comes to rest on the trailer bed 17. (FIG. 10). Should an obstruction prevent the deck 60 from lowering onto the trailer bed 17, the deck can be re-raised to position 50H to unlock the fully extended lip 92. (FIG. 11). The overall range of motion of the leveler 20 is between extreme lower limit position 50I (FIG. 12) and extreme upper limit position 50J (FIG. 13), which are not intended to show normal operating positions.

The dock leveler 20 includes lip extension and lip locking mechanisms 100 and 102 shown in FIGS. 1-13. The extension mechanism 100 is disengaged 106 to allow the lip 80 to hang pendant 91 when the deck 60 is parked 50A (FIG. 3), or is moved toward its cocked position 50C (FIG. 5) to engage 107 the extension mechanism 100. Once engaged 107, the lip extension mechanism 100 actively and forcibly drives or rotates the lip 80 forward as the deck 60 is lowered through its first lowering stage (FIG. 4) to transition position 50E, 50' (FIGS. 7 and 8) where the lip 80 is fully extended 92. At position 50E, 50E', the lip extension mechanism 100 automatically disengages 107, and a lip locking mechanism 102 automatically and simultaneously engages 108 to hold the lip 80 in its fully extended position 92. The locking mechanism 102 locks and holds 108 the lip 80 in its fully extended position 92 as the deck 60 is lowered through its second lowering stage. (FIG. 9). The lip is rigidly fixed against downward movement, but can rotate up a slight distance due to the small 0.15 inch gap between the hinged end 82 of the lip 80 and the front end 64 of the deck 60. The lip 80 remains locked in fully extended position 92 until it comes to rest on the trailer bed 17 at bridge position 50G (FIG. 10) where locking mechanism 102 releases 109 its locked hold on the lip. The lip 80 is then free to pivot up and down about its hinge 89 as the trailer bed rises or falls during the process of loading or unloading the truck trainer.

The deck can be easily returned to its stored position 50A. (FIG. 3). Because the lip 80 is unlocked 109 when resting on a trailer bed 17, the lip will return to its pendant position 91 when the deck 60 is re-raised to a partially raised position 50B such as in FIG. 4. The deck 60 can then be returned to stored position 50A. Should an obstruction or safety precaution prevent the deck 60 from being lowered into engagement with the truck bed 17 after the lip extension or locking mechanism 100 or 102 is engaged 107 or 108, the deck can be re-raised to position 50H to unlock 109 the locking mechanism 102 (FIG. 11) and allow the lip drop to its pendant position 91.

The lip extension mechanism 100 is formed by several components including an actuation bar 110, drive rod 140 and drive bracket 150, which work in conjunction with the lock block 70, unlock block 75, deck surface 66 and spring 125. When engaged 107, the actuation bar 110, drive rod 140 and drive bracket 150 are aligned one adjacent to the other, and are selectively connected in series to work in unison to extend the lip 80. The components 110, 140 and 150 are permanently secured or releasably linked or joined in a force transmitting relationship to enable the extension assembly 100 to push the lip 80 from its pendant position 91 to its extended position 92, and hold the lip in place relative to the deck 60.

Figure 21:
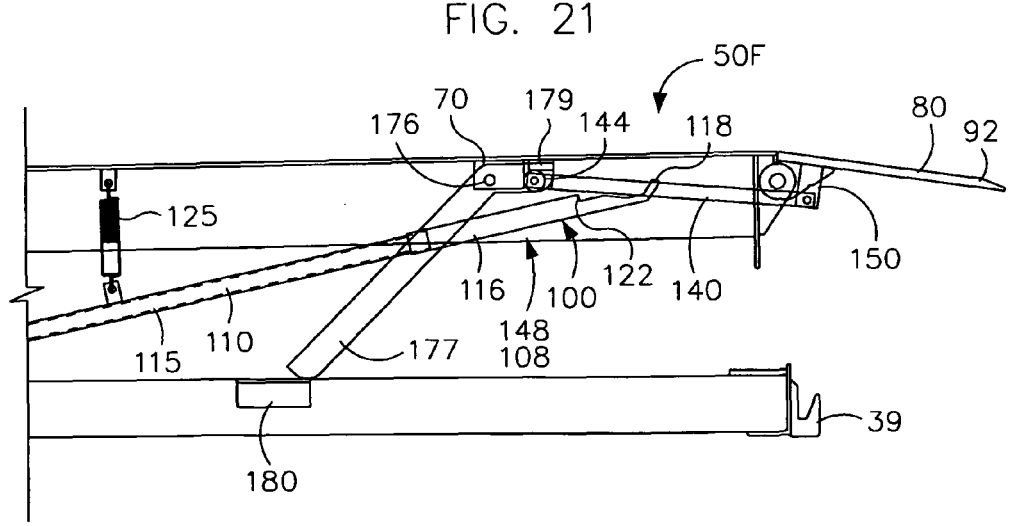
FIG. 21 is a side view of the alternate embodiment showing the deck and lip assembly in a further lowered to transition position 50F with the lip locking mechanism 102 locked 108 and the lip in fully extended 92 (pre-transition), and with the unlock mechanism 170 beginning to engage the frame skid plate 180.

The lip locking mechanism 102 is formed by the combined locking engagement between the deck 60, lock block 70, lip 80, drive rod 140 and bracket 150 to hold and retain the lip 80 in its extended position 92 as the deck continues to be lowered toward the trailer bed 17 as at position 50F. (FIGS. 9 and 21).

The actuation bar 110 is generally linear with a pinned rear end 113 and a free front end 114. The length of the actuation or push bar 110 varies proportionally with and is preferably about the same as the length of the deck 60. Rear end 113 remains pinned or otherwise pivotally secured to the pivot rod of bracket 38 near the rear end of base frame 31. Front end 114 is not pinned or otherwise fixed to allow the bar 110 to selectively pivot about its rear end 113. The bar 110 has a main portion 115 that includes and extends forward from rear end 113. The main portion 115 is formed by a square tube with a solid rear end section with a pin attachment hole. The bar 110 has a symmetrical forked portion 116 formed by two parallel prongs 117 proximal its front end 114. The prongs 117 are evenly spaced about the centerline of the bar 110. Each prong 117 has a length of about 1.5 feet. The rear end of each prong 117 is rigidly fixed to and preferably integral with the main portion 115 of bar 110. The outer or free ends 114 of the prongs 117 are joined by a flat bar that can take the form of a clevis pin 118. The forked portion 116 has a specifically shaped top surface 121. About midway along the top surface 121 of fork 116 is a recess that forms a drive abutment 122. The top surface 121 has an upwardly facing concave arcuate shape proximal its free end 114.

The spring 125 elevates the actuation bar 110 from the base frame 31 and flexibly joins it to the deck 60. When the deck assembly 50 is parked 50A (FIG. 3), actuation bar 110 is at about a 10° angle relative to the base frame 31 and deck 60. One end of the spring 125 is pivotally secured to bar 110 at a predetermined location proximal its midsection. The opposite end of the spring 125 is pivotally secured to the deck 60 proximal its midsection. The spring 125 extends normal (90°) to the actuation bar 110, and at a 10° forward angle relative to the deck 60. When parked 50A, the spring 125 is substantially unflexed and holds the free end 114 of the bar 110 near the deck 60, but not in direct engagement with the deck. The forked portion 116 of bar 110 is about ten inches away from the lock block 70, and the free end 114 of the bar is about three inches away from the underside 66 of the deck 60. The spring 125 is preferably a helical spring with a K value of about 14 lbs/inch and a length of about 7.5 inches. The size and strength of the spring 125 are selected so that it stretches about ¼ to ½ inch do to the weight of the lip actuation bar 110 when at the stored position 50A, and stretches about two to three inches when at the fully raised position 50C.

Figure 2:
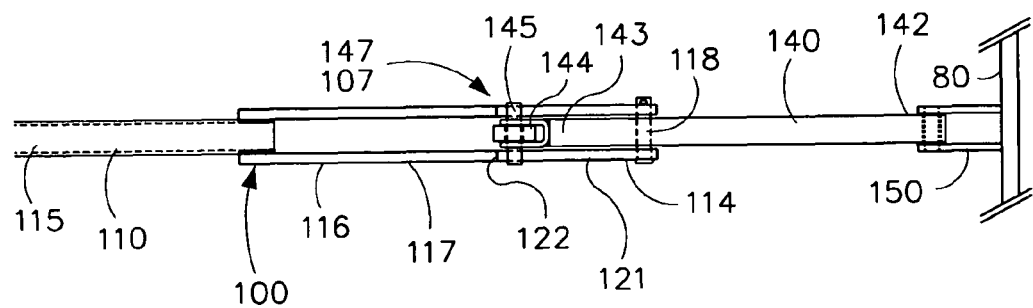
FIG. 2 is a top view showing the linear alignment of the lip actuation bar 110, drive rod 140 and drive bracket 150 components of the lip extension mechanism 100.

The drive rod 140 is linear with an end-to-end 142 and 143 length of about 19 inches. Front end 142 remains pinned or otherwise pivotally secured to the lip drive bracket 150. Rear end 143 has a projection for engaging the abutment 122. The projection is preferably formed by a forked mounting bracket that receives and supports a central roller 144. The roller 144 is rotatably secured to the rear free end 143 of the drive rod 140 by a pin 145. The drive rod 140 and roller 144 are received between the prongs 117 of the actuation bar 110 as shown in FIG. 2. When parked 50A (FIG. 3), the ends of pin 145 extend outward from the roller 144 to engage the prongs 117. The ends of the roller pin 145 project from the roller 144 to engage and rest on the upper surface 121 of the prongs 117. The weight of the drive rod 140 and roller 144 bias roller pin 145 into engagement with the top surface 121 of actuation bar 110. (FIGS. 1-7 and 10). Both the roller 144 and roller pin 145 have their own bushing (not shown). The roller pin 145 bushing prevents the roller pin from turning with the rolling 144 as the roller rolls across the bottom 71 of lock block 70.

The drive bracket 150 is rigidly fixed to the underside of the lip 80. The bracket 150 is formed by two spaced plates 152. The front end 142 of the drive rod 140 is pinned to the lower end of each plate 152. The drive bracket 150 extends downwardly from the lip 80 to a point sufficiently below the lock block 70. The drive bracket 15 extends a sufficient distance below the lock block 70 to allow the drive rod 140 to angle toward the deck 60 when the lip is extended 92 and in generally planar orientation to the deck, and the roller pin 145 is engaging abutment 122 as in FIG. 7. When in this position 50E, the substantial about 200 pound weight of the lip 80 allows the about 5° angle of the rod 140 relative to the deck 60 to generate enough force to push the lighter about five pound weight of the rod 140 and wheel 144 out of engagement with abutment 122 and into engagement with the lock block 70. The upward force generated by the weight of the lip 80 overcomes the downward force generated by the weight of the rod 140 and wheel 144 that bias them toward actuation bar 110.

An unlock mechanism 170 is formed by several components including the unlock block 75, the front end 114 or clevis pin 118 or the actuation bar 110, and drive rod 140. The unlock mechanism 170 unlocks the lip 80 when the deck assembly 50 is re-raised to position 50H as shown in FIG. 11.

Figure 6:
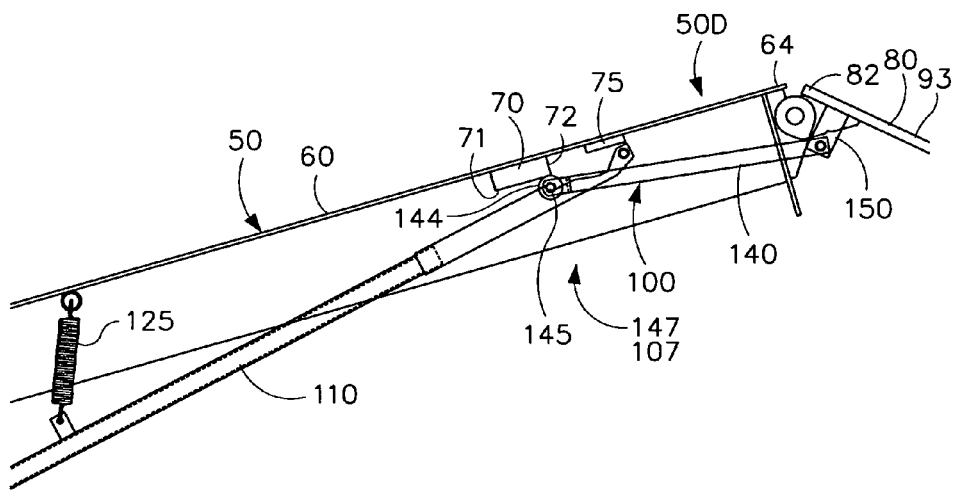
FIG. 6 is a side view showing the deck and lip assembly in a lowering position 50D with the lip extension mechanism in driving engagement 107, and with the actuation bar, drive rod and drive bracket moved forward to partially extend the lip.
Figure 14:
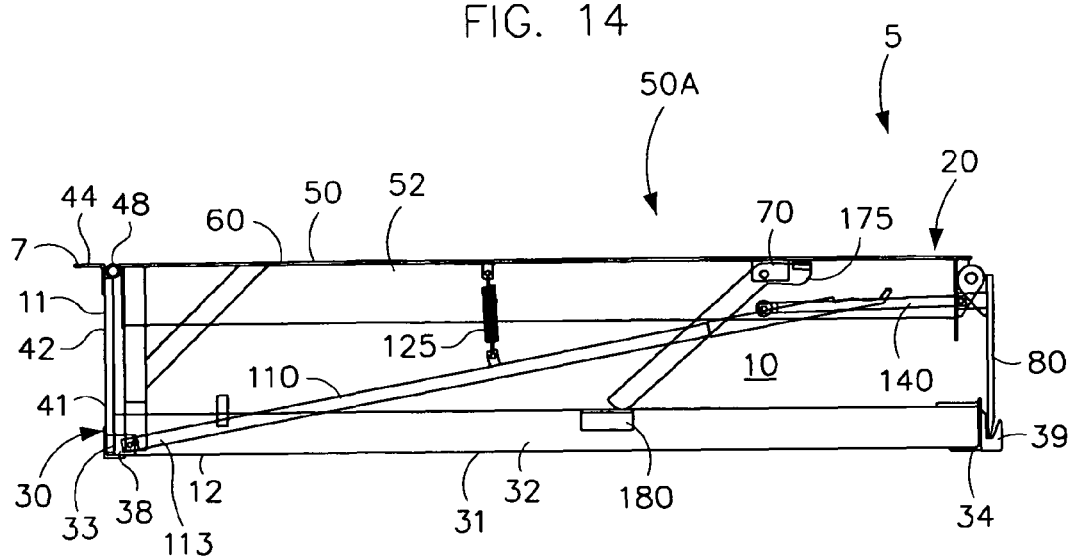
FIG. 14 is a side view of an alternate embodiment of the dock leveler 20 showing the mounting frame 30 in a loading dock pit with the deck and lip assembly 50 in its parked position 50A and the lip extension mechanism 100 disengaged 106, and with an alternate unlock mechanism 170.
Figure 15:
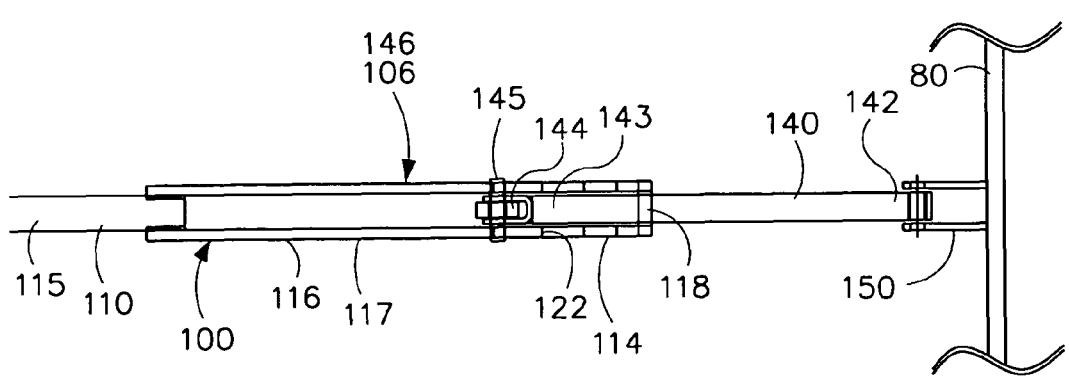
FIG. 15 is a top view of the alternate embodiment showing the linear alignment of the lip actuation bar 110, drive rod 140 and drive bracket 150 components of the lip extension mechanism 100 for the alternate embodiment.

The drive rod 140 is normally disengaged 106, 146 from active pushing engagement with actuation bar 110 (FIGS. 14 and 10), but is selectively brought into active driving or cocked engagement 107, 147 at raised position 50C (FIG. 5) where the roller pin 145 automatically drops down into engagement with abutment 122. Then, during the first lowering stage or lip extending stage, the abutment 122 of bar 110 forcibly engages the roller pin 145 to push the rod 140 and bracket 150 forward to rotate lip 80 to its extended position 92. (FIGS. 5-7). The extension mechanism 100 is disengaged 107, 147 when the lip 80 reaches transition position 50E, 50'. (FIGS. 7 and 8). The lip is now fully extended 92 with only about a 0.15 inch gap between the rear end 82 of the lip 80 and the front end 64 of the deck 60. At this position 50E, 50E', the drive rod 140 automatically and simultaneously moves into locked engagement 108, 148 with the lock block 70 and deck 60 to lock and hold the lip 80 in this extended position 92. Then, during the second lowering or lip locked stage, the deck 60 continues toward the trailer bed 17. (FIG. 9). The rod 140 automatically releases from the lock block 70 when the lip 80 engages the trailer bed 17. (FIG. 10). This engagement closes the 0.15 inch gap which releases the pressure on the roller 144 so that the roller and rod 140 drops down under their own weight. The lip 80 will now return to its pendant position 91 when the deck 60 is re-raised (FIG. 4) and returned to its parked position 50A. (FIG. 3).

Alternate Embodiment

An alternate embodiment of the unlock mechanisms 170 is shown in FIGS. 14-26. The components forming the leveler 20 and lip extension mechanism 100 are basically the same except that an unlock lever 175 replaces the unlock block 75. The unlock lever 175 is pivotally secured to the lock block 70 by a pivot pin 176. The lever 175 has a hockey stick shape with a longer leg or handle portion 177 and a shorter foot or blade portion 178. The lever 175 is a unitary piece with the handle 177 and blade 178 joined at about a 140° angle at its bend or heel. The heel is pinned 176 toward the rear end of the lock block 70 so that the blade flushly engages the underside 66 of the deck 60. The elongated handle 177 angles rearwardly and downwardly so that the weight of the handle 177 biases the blade 178 up or counterclockwise and into flush engagement with the underside 66 of the deck 60. The blade 178 has a front end with a sideways facing or horizontal plate 179. The blade 178 is sufficiently long so that the plate 179 is located forward of the front wall 72 of lock block 70.

Figure 20:
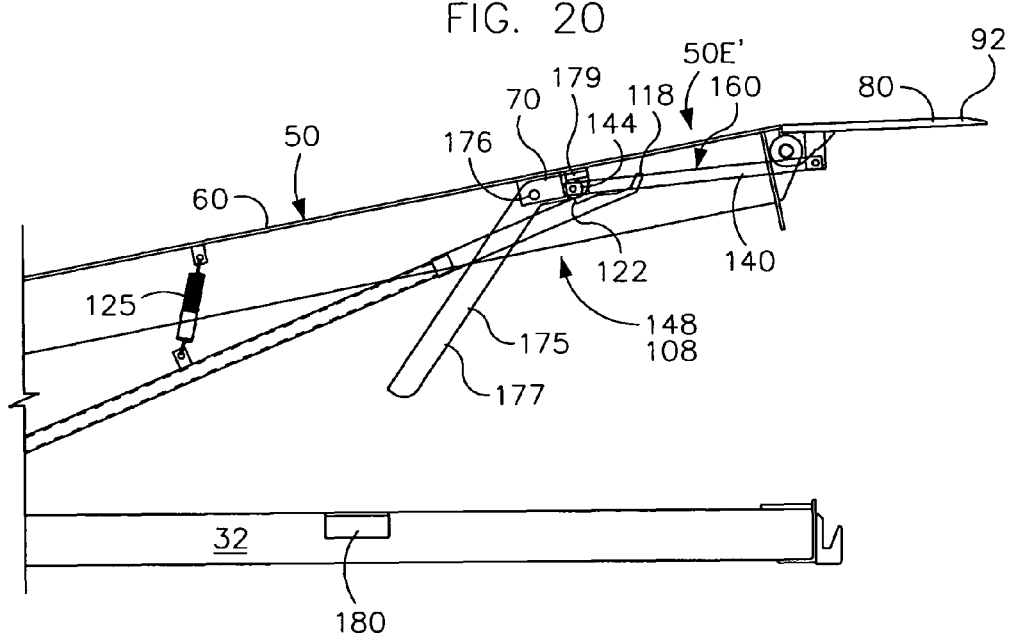
FIG. 20 is a side view of the alternate embodiment showing the deck and lip assembly in transition position 50E' with the lip extension mechanism 100 released or disengaged 106' due to the roller pin 145 disengaging from abutment 122, and with the locking mechanism 102 engaged 108 due to the roller 144 moving to locked engagement with a lock block 70 (post transition) to hold the lip in its fully extended position 92, and with the unlock mechanism 170 hanging disengaged.

The unlock lever 175 engages the drive rod roller 144 during the second stage of the lowering of the deck and lip assembly 50 when the lip extension mechanism 100 reaches transition position 50E' as in FIG. 20. The unlock lever 175 does not activate until deck assembly 50 is lowered below a set unlock position 50F' without the lip 80 engaging the bed 17 of a trailer as in FIG. 21. The set position 50F' is determined by the length of the lever leg 177 and location of a skid plate or unlock abutment 180, and is preferably at about the cross traffic position 50A'. When the deck assembly 50 and its extended 92 lip 80 reach unlock position 50F', the lower end of the handle 177 engages the skid plate 180 fixed to the base frame 31.

Figure 22:
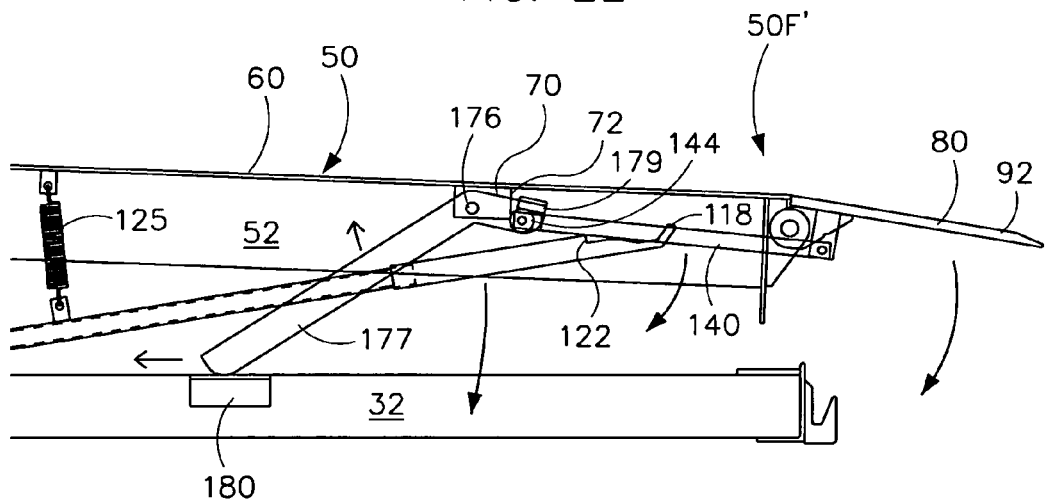
FIG. 22 is a side view of the alternate embodiment showing the deck and lip assembly in transition position 50F' with the unlock mechanism 170 being rotated by the frame abutment 180 to unlock the lip locking mechanism 102.

With the unlock lever 175 engaged and the deck assembly 50 continuing to lower, the bottom of leg 177 slides rearwardly along the flat horizontal plate 180, which causes the lever 175 to rotate clockwise about pin 176 as in FIG. 22. This lever rotation forces the blade 178 and its plate 179 to move down and away from the deck 60. The downward movement of the drive plate 179 dislodges the roller 144 and rear end 143 of the lip drive rod 140 from locked engagement 108, 148 with the front wall 72 of the lock block 70. The lip extension mechanism 100 and lip drive rod 140 are now unlocked 109, 149 and drop under their own weight onto actuation bar 110 to the disengaged position 106, 146 where the roller pin 145 located rearward of abutment 122 so that lip 80 is free to rotate down under its own weight to pendant position 91. The deck 50 is easily placed back into stored position 50A by raising the deck and lip assembly 50 above stored position 50A, and then lowering the assembly 50 with the lip 80 engaging and resting in support 39 as in FIG. 14.

Operation of Dock Leveler and Lip Extension Mechanism

Although the operation of the dock leveler 20 and its lip extension mechanism 100 should be apparent from the above disclosure, the following is provided to assist the reader. The lip extension mechanism 100 moves between disengaged 106 (FIGS. 3-4 and 16) and engaged 107 (FIGS. 5-7 and 17-19) positions. The lip locking mechanism 102 moves between locked 108 (FIGS. 8-9 and 20-21) and unlocked 109 (FIGS. 10 and 22) positions. The lip drive rod 140 is the swing or control link in both mechanisms 100 and 102 that activates and deactivates the mechanism by and moving between disengaged 146, engaged 147, locked 148 and unlocked 149 positions.

Figure 16:
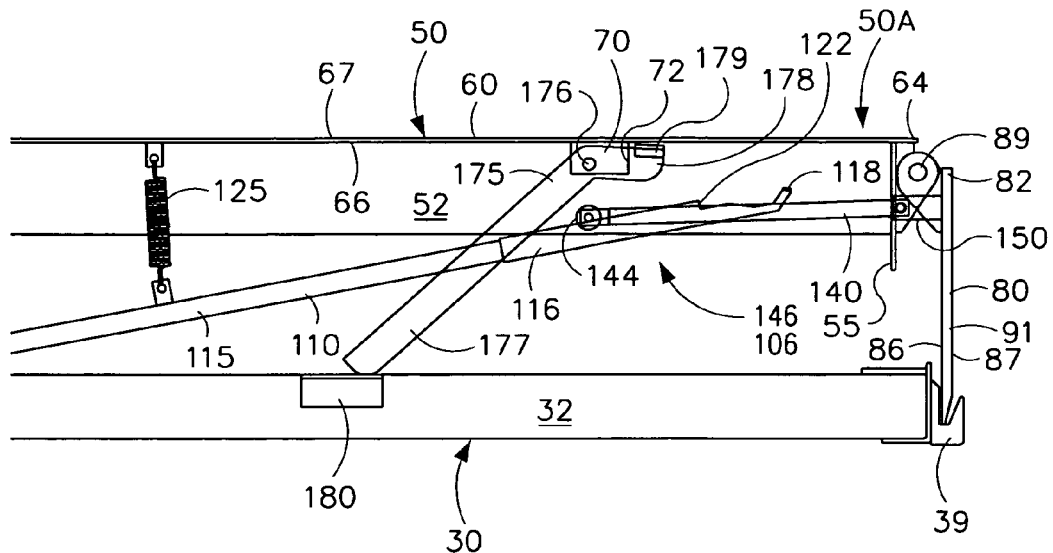
FIG. 16 is an enlarged side view of the alternate embodiment of FIG. 14 showing the deck and lip assembly in its parked position 50A and the lip extension mechanism 100 disengaged 106 and the unlock mechanism 170 disengaged.
Figure 17:
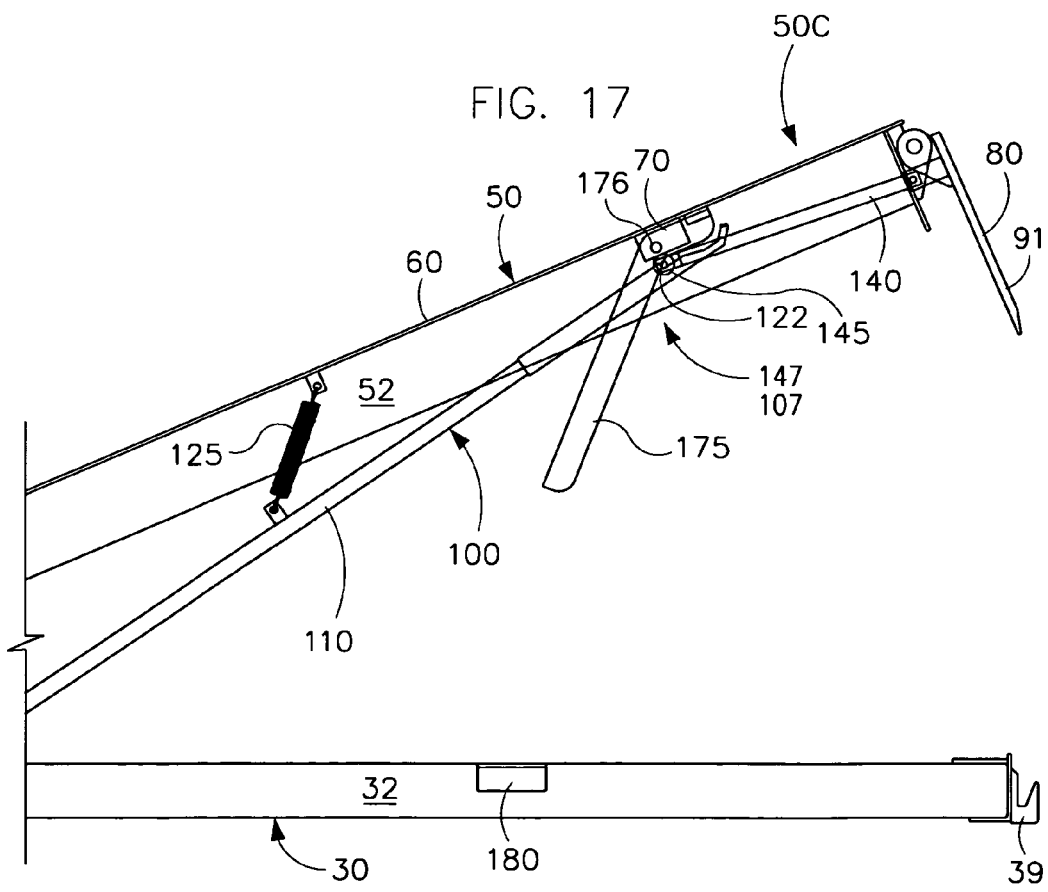
FIG. 17 is a side view of the alternate embodiment showing the deck and lip assembly sufficiently raised 50C to draw back the actuation bar 110 and allow the roller pin 145 to drop into engagement with drive abutment 122 to engage 107 the lip extension mechanism 100 while the lip hangs pendant 91 and the alternate unlock mechanism 170 hanging down in its disengaged position.
Figure 18:
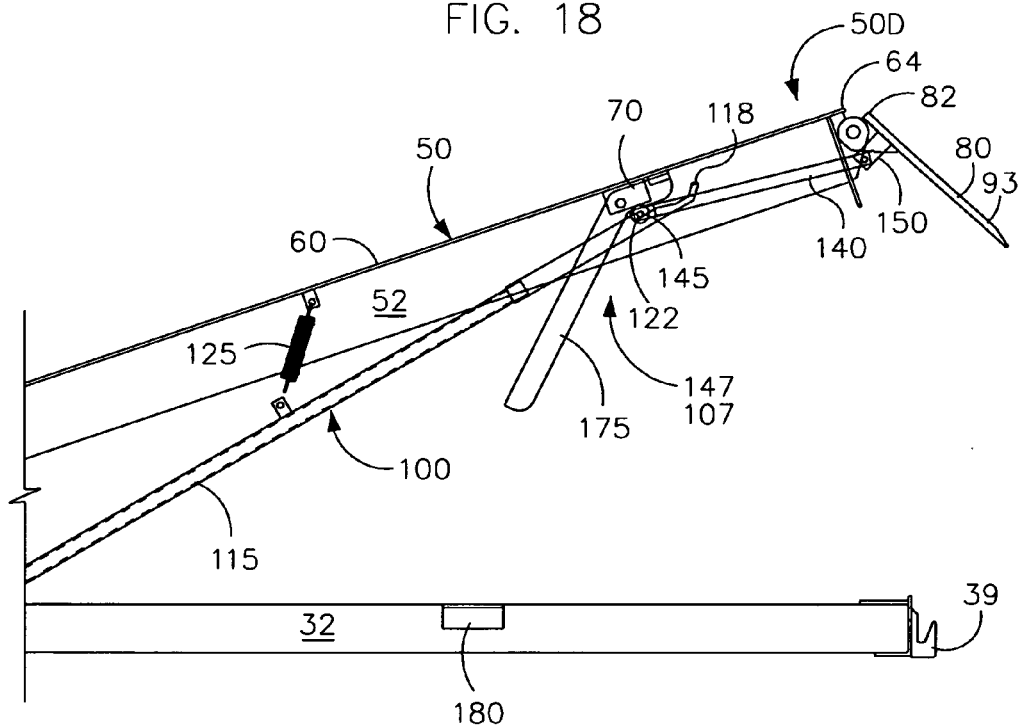
FIG. 18 is a side view of the alternate embodiment showing the deck and lip assembly in a lowering position 50D with the lip extension mechanism engaged 107, with the actuation bar 110, drive rod 140 and drive bracket 150 moved forward to partially extend the lip, and with the lock mechanism 170 hanging disengaged.

The components forming the lip extension mechanism 100 have a preferable orientation when in the parked 50A position. (FIGS. 3 and 16). The hinge points 38 and 48 of the deck 60 and actuation bar 110 are spaced apart a vertical distance about equal to the height of the pit 10. The actuation bar 110 angles toward the horizontal deck 60 via spring 125. The front end 114 of the bar 110 is located near the deck header plat 55. The drive rod 140 is planar to the deck 60 with its roller 144 located directly below the lock block 70. The roller pin 145 of rod 140 rests on the top surface 121 of the forked portion 116 of actuation bar 110 at a location rearward of drive abutment 122. The lip 80 hangs pendant 91 and normal to the deck 60, so that its bracket 150 is parallel to the deck. As the deck 60 is raised to a partially elevated position 50B (FIG. 4), the deck 60 and actuation bar 110 rotate counterclockwise about hinges 48 and 38, respectively. The spring 125 rises with the deck 60, and thus pulls or biases the front end 114 of the actuation rod 110 up toward deck 60.

The deck 60 and bar 110 move differently when the deck assembly 50 rises to draw back the actuation bar 110 relative to the drive rod 140. The draw back or cocking of the actuation bar 110 results from the fixed vertical spacing of hinge points 38 and 48. The actuation bar hinge point 38 is below the deck hinge point 48. This spacing causes the front end 114 of actuation bar 110 to draw back away from the header 55 and front end 64 of deck 60 when the deck assembly 50 is rising, and move forward toward the header 55 and front end 64 when the deck assembly is lowering. The draw back or cocking of the actuation bar 110 is accentuated by the upwardly angled orientation of actuation bar 110 relative to the deck 60. This angle orientation causes the actuation bar 110 to rotate rearwardly relative to the deck 60 when the assembly 50 is rising, whiled the deck simultaneously rotates higher relative to the bar when the assembly is rising. The different relative rotating movements of the bar 110 and deck 60 cause two relative movements as the deck assembly 50 is raised to position 50B. (FIG. 4). First, the roller 144 moves forward on actuation bar 110 toward abutment 122. Second, the spring 125 biases or draws the free ends 114 and 143 of the actuation bar 110 and drive rod 140 toward the underside of the deck 60 until the roller 144 contacts the bottom 71 of the lock block 70. The roller 144 and pin 145 are captured between the upper surface of the actuation bar 110 and the bottom surface 71 of the lock block 70.

As the deck 60 continues to rise toward cocked position 50C (FIGS. 5 and 17), the roller 144 remains captured or pressed against the surface 71 of lock block 70 at a fixed or stationary location because the lip 80 remains in its pendant position 91. However, the actuation bar 110 continues to move or be drawn rearwardly relative to the deck 60 and lock block 70, so that its abutment 122 moves toward and into engagement with the roller pin 145. When the roller pin 145 clears the edge of the abutment 122, the stretched spring 125 pulls the actuation bar 110 up so that it remains pressed against the roller 144 and the roller remains pressed against the lock block 70. The lip extension mechanism 100 and drive rod 140 are now in a sufficiently raised or cocked position 50C so that the bar 110, rod 140 and bracket 150 are in driving engagement 107 and 147 with the lip 80.

Figure 19:
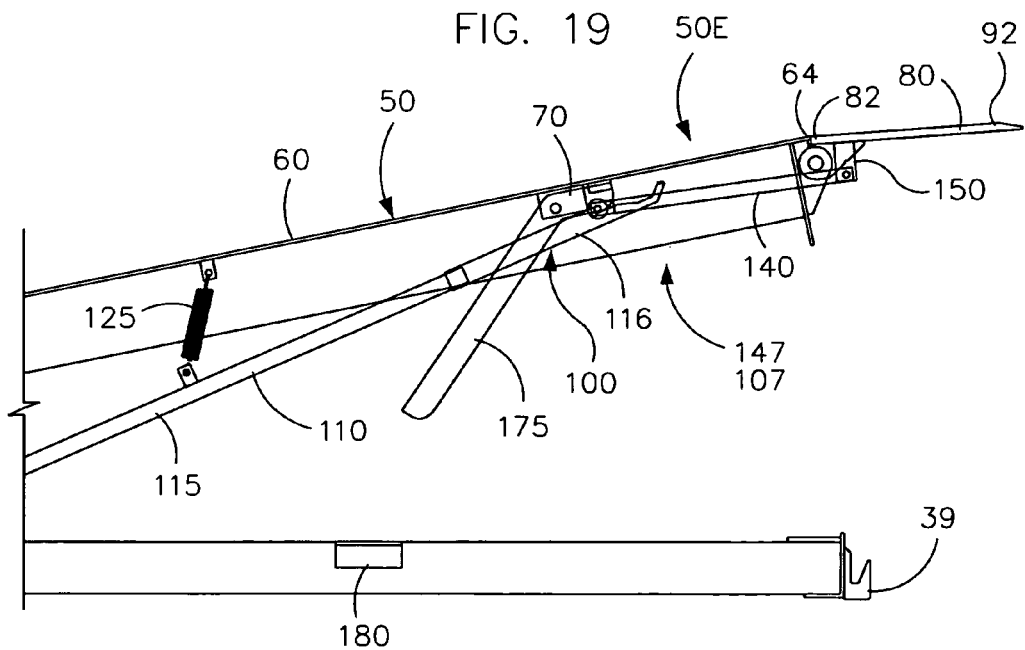
FIG. 19 is a side view of the alternate embodiment showing the deck and lip assembly lowered to transition position 50E with the lip extension mechanism still engaged 107 (pre-transition), with the actuation bar 110, drive rod 140 and drive bracket 150 moved further forward to rotate the lip to its fully extended position 92, with the drive abutment 122 and roller pin 145 located slightly in front of the lock block 70, and with the unlock mechanism 170 hanging disengaged.

The deck and lip assembly 50 is now ready to be lowered to extend the lip 80 as shown in FIGS. 5-7 and 17-19. During the first lowering stage, lowering the deck assembly 50 causes the actuation bar 110 to move forward relative to the deck 60 and lock block 70. The forward movement of bar 110 pushes or drives rod 140 and bracket 150 forward to rotate the lip 80 about hinge 89. The lip 80 extends from its hanging position 91 (FIGS. 5 and 17), through an intermediate extended position (FIGS. 6 and 18) to fully extended position 92. (FIGS. 7 and 19).

During the lip extension stage, the actuation bar 110 and drive rod 140 are securely engaged to move in unison in a slightly angled, substantial linear alignment. At cocked position 50C (FIGS. 5 and 17), the actuation bar 110 and drive rod 140 form about a 160° angle, and are only about 20° out of complete linear alignment. The actuation bar 110 is angled about 15° relative to deck 60 and planar alignment with the bottom surface 71 of lock block 75, and the drive rod 140 is angled about 5° relative to the deck and bottom surface 71. The majority of the driving force of the extension mechanism 100 is generally planar to the deck 60 to drive bracket 150 forward and rotate lip 80 to its extended position 92. The upward forces caused by their slight angled relationship press the forked portion 116 of actuation bar 110 against the roller pin 145, and press roller 144 against lock block 70 to help ensure the mechanism 100 remains engaged 107. The roller pin 145 is on the lower offset part of forked portion 116 and in secure abutting engagement with drive abutment 122. The roller 144 moves toward the front wall or surface 72 of the lock block 70. The lock block 70 has length sufficient to allow rolling engagement between the roller 144 and lower surface 71 until the lip 80 reaches its fully extended position 92. The clevis pin 118 at the end of the actuation bar 110 clears and does not engage the unlock block 75.

A transition occurs when deck and lip assembly 50 reaches position 50E and lip 80 is fully extended 92. (FIGS. 7 and 19). The rod 140 of lip extension mechanism 100 automatically moves out of engagement 107 with bar 122, and simultaneously moves into locked engagement 108 with the lock block 170 at position 50E'. (FIGS. 8 and 20). This transition occurs when the drive abutment 122 of actuation bar 110 and the roller pin 145 are slightly beyond or in front of the wall 72 of the lock block 70. The outer surface of the roller 144 just clears the front wall 72. The weight of the lip 80 pushes the roller 144 up or toward the deck 60. The substantial weight of the lip 80 and deckward angled orientation of drive rod 140 (about 5°) combine to push the roller 144 up into engagement with the lock block 170. The force generated by the weight of the lip is sufficient to overcome the weight of the rod 140 and roller 144. The roller pin 145 slides out of engagement with the actuation bar 110, and the roller 144 rolls into engagement with the front wall 72 of the lock block 70 and the bottom 66 of deck 60 (FIG. 8) or plate 179. (FIG. 20). When in this locked position 148, the drive rod 140 remains generally pointed at the lock block 70 and slightly angled toward the deck 60 so that the weight of the lip 80 keeps the roller 144 locked in place. As noted above, the front wall or surface 72 extends a distance below the bottom 66 of the deck 60 sufficient to securely accommodate the roller 144 when in locked position 148.

During the second lowering stage or lip locked stage, the locking mechanism 102 remains engaged and lip 80 remains extended 92. Although the spring 125 loses tension on the push bar 110, the clevis pin 118 engages the top surface of the drive rod 140 so that the drive rod 140 is now supporting the free end 114 of the actuation bar 110. (FIGS. 8-9 and 20-22).

Figure 23:
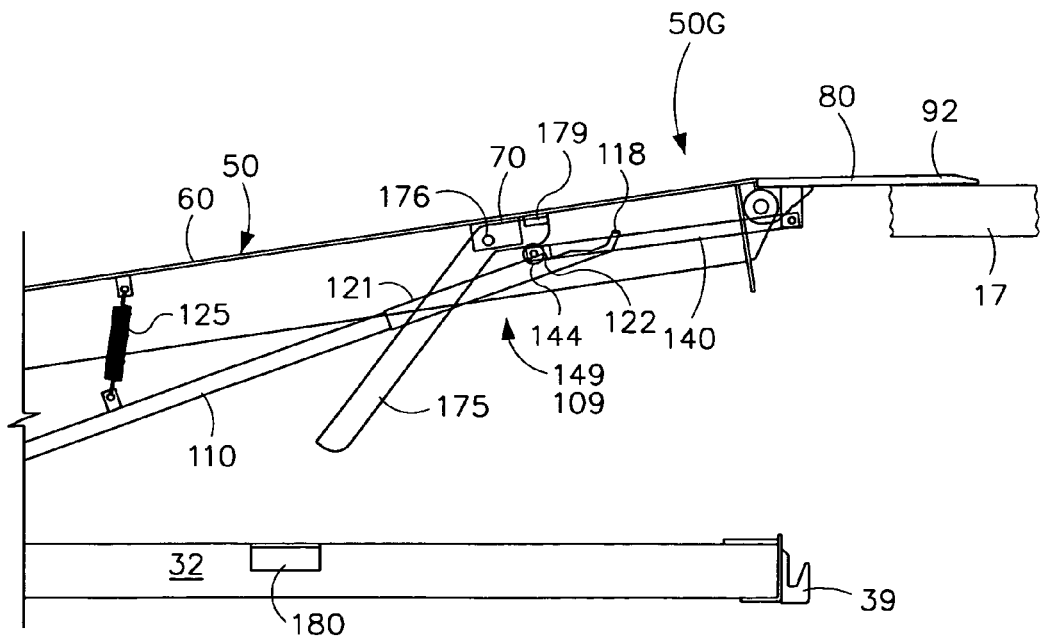
FIG. 23 is a side view of the alternate embodiment showing the deck and lip assembly in lowered position 50G with the extended lip resting on a truck trailer, the locking mechanism 102 is unlocked 109 as force engagement between drive rod 140 and lock block 70 is released, and the lip extension mechanism 100 is disengaged 106 as the drive rod is resting on the actuation bar 110 with roller pin 145 located rearward abutment 122.
Figure 24:
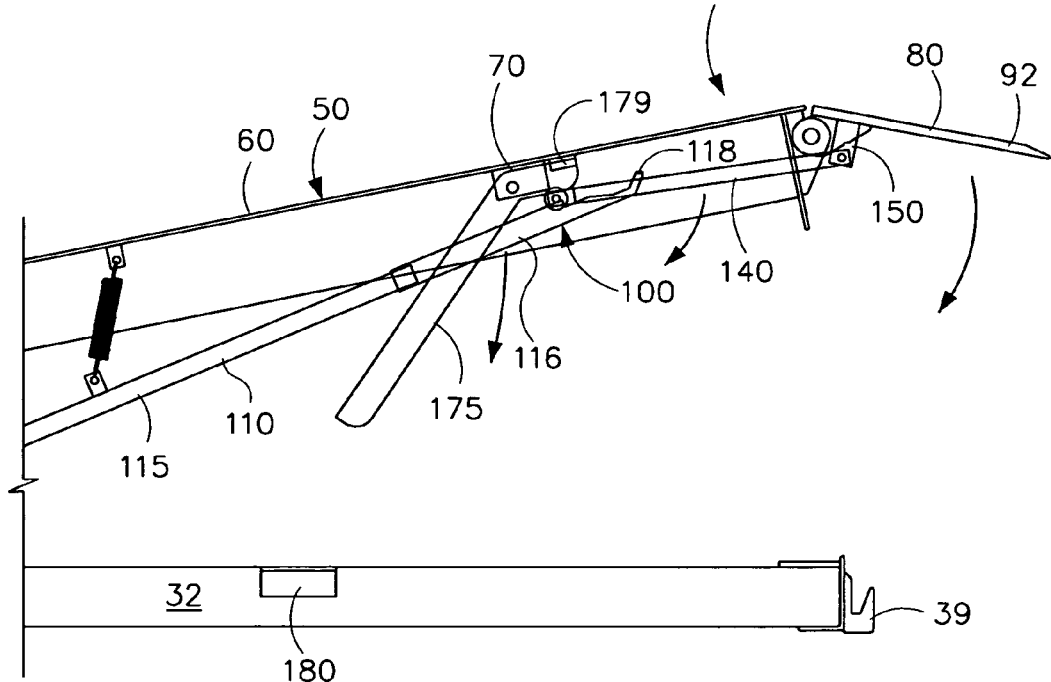
FIG. 24 is a side view of the alternate embodiment showing the dock leveler with the deck and lip assembly raising off the truck bed 50G', with the lip locking mechanism 102 unlocked 109 and the lip rotating down under its own weight from its pendant position 92.

When the extended lip 80 comes to rest on the bed of the trailer bed 17 at position 50G as shown in FIGS. 10 and 23, the lip locking mechanism 102 unlocks 149. The weight of the fee end 84 of the lip 80 is now supported and the gap between the front end 64 of the deck 60 and rear end 82 of the lip 80 and deck closes. The weight of the lip 80 is no longer pushing the roller pin 145 of drive rod 140 against the lock block 70, which releases the force pressing the roller 144 against the front wall 72 of the lock block 70 and the bottom surface 66 of the deck 60. The locked engagement 108, 148 between the deck 60, lock block 70 and drive rod 140 is released, and the roller 144 and free end 143 of the drive rod 140 drop down under their own weight until roller pin 145 engages the spaced prongs 117 of actuation bar 110. When the trailer bed 17 is about the same height as the loading dock floor 7, the roller 144 returns to a location on the actuation bar 110 downward of drive abutment 122 as in FIGS. 3 and 16. Depending on the height of the truck bed 17, the lip 80 is now substantially horizontal to the building floor 7 and the trailer bed 17.

The deck can be easily returned to its stored position 50A. Because the drive rod 140 is unlocked 149 when the lip 80 rests on a trailer bed 17, the lip will return to its pendant position 91 when the deck 60 is re-raised to a position such as in FIGS. 4 and 24, or when the truck trailer pulls away from the loading dock. The weight of the lip 80 biases it into its pendant position 91 so the deck 60 can be returned to its stored position 50A as in FIGS. 3 and 16 with the free end 84 of the lip 80 received by lip supports 39.

Should an obstruction or safety precaution prevent the deck assembly 50 from being lowered into engagement with the truck bed 17 after the lip is extended as in position 50E or 50F, the first embodiment of the lip extension mechanism 100 allows the deck to be re-raised to position 50H to unlock 109 the lip 80 from rigid engagement with deck 60. (FIG. 11). As the deck assembly 50 is raised beyond position 50H, the free end 114 of the actuation bar 110 rides along unlock block 75 toward roller 144. The clevis pin 118 is pushed down by the unlock block 75, which forces the drive rod 140 and roller 144 down and out of locked engagement 109, 149 with the lock block 70 and onto the actuation bar 110. The lip 80 drops to its pendant position 91, so the deck and lip assembly 50 can be lowered to its stored position 50A.

Figure 25:
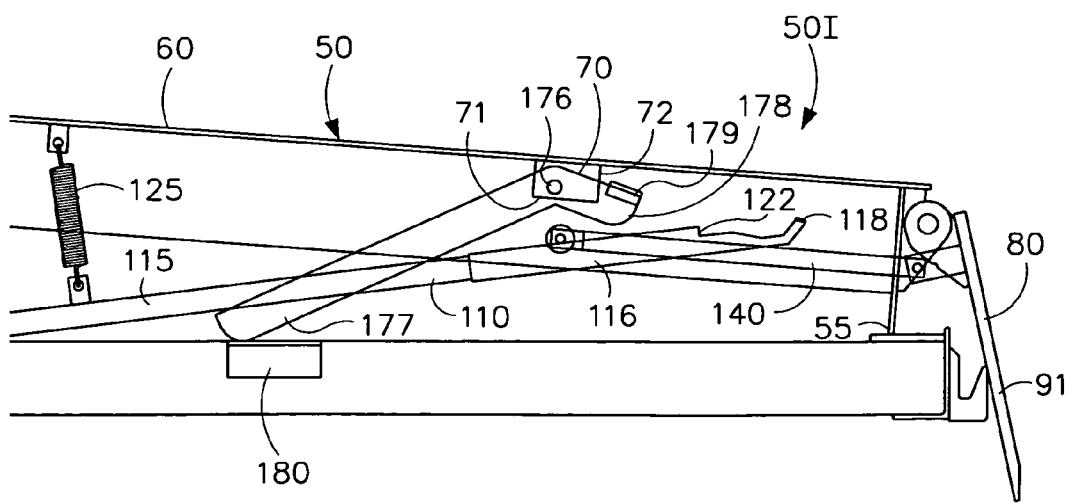
FIG. 25 is a side view of the alternate embodiment showing the deck and lip assembly at its lower limit of motion 50I with the header plate 55 engaging and bottoming out against the support frame 30 and the unlock the lip locking mechanism 102 unlocked 109.
Figure 26:
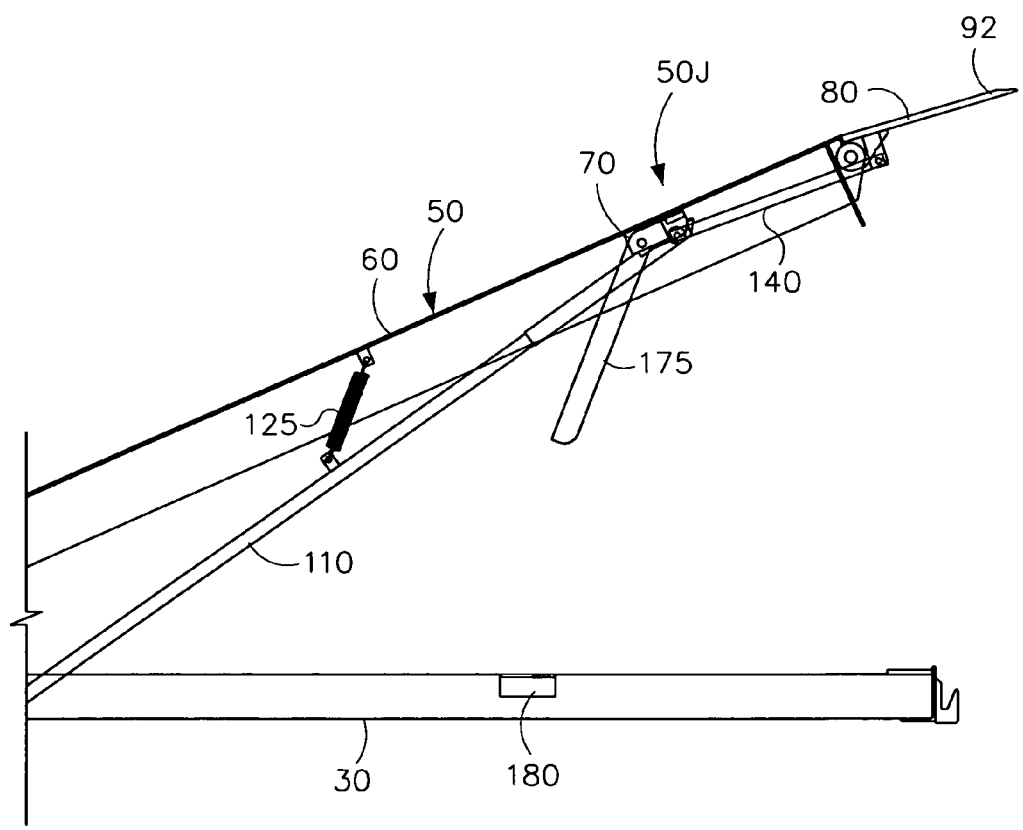
FIG. 26 is a side view of the alternate embodiment showing the deck and lip assembly at its upper limit of motion 50J with the lip extension mechanism components 110, 140 and 150 fully extended and the clevis pin 118 engaging roller 144 to prevent the deck from rising any further.

In the alternate embodiment, the lip extension mechanism 100 includes unlock mechanism 170 to unlock the locking engagement 108, 148 between the lip drive 140 and the lock block 70. The unlock mechanism 170 is activated when the lip does not engage a truck bed 17 and is lowered beyond position 50F. (FIG. 21). The unlock lever 175 unlocks the locking engagement 108, 148 between the drive rod 140 and the lock block 70 when the deck 60 is lowered to position 50F' or 50I as shown in FIGS. 22 and 25.

While the invention has been described with reference to a preferred embodiment, it will be understood by those skilled in the art that various changes may be made and equivalents may be substituted without departing from the broader aspects of the invention.

We claim:

1. A dock leveler for forming a bridge between a loading dock and a trailer bed, said dock leveler comprising:
   a deck with a front end, rear hinged end and lock block secured to its lower surface, said lock block having a bottom surface spaced from said lower surface, and said deck being movable through a range of raised and lowered positions;
   a lip with a free end, a rear end hinged to said front end of said deck, a lower lip surface and a drive bracket extending from said lower lip surface to form a pivot point spaced from its said lower lip surface, said lip being operably movable between pendant and extended positions, said lip being biased by its own weight toward said pendant position;
   a lip extension assembly movable between engaged and disengaged positions and including an actuation bar and a drive rod, said actuation bar having a hinged rear end, a front end and a drive abutment located proximal said front end, said drive rod having a front end joined to said pivot point of said drive bracket and a rear end with a projection, said projection being positioned below said lock block to operably engage said bottom surface of said lock block when said lip is in its said pendant position, said actuation bar capturing said projection against said lock block when in said engaged position, said projection drivingly engaging said abutment when in said engaged position and releasing from said abutment when in said disengaged position, and said lip extension assembly is biased into said disengaged position when said deck is in a stored position, biased into said engaged position when said deck is raised to a raised position and biased to release from said engaged position when said deck is lowered to a transition position;
   a lip locking assembly movable between locked and unlocked positions, said lip locking assembly being biased into said locked position with said drive rod securely engaging said lock block to hold said lip in its said extended position when said deck is lowered to said transition position, and said locking assembly being biased into said unlocked position with said drive rod releasing from said lock block when said extended lip engages the trailer bed; and, wherein said actuation bar draws back to engage said lip extension assembly when said deck rises to said raised position, said lip extension assembly drives said lip into said extended position as said deck lowers from said raised position to said transition position, said locking assembly holds said lip in said extended position as said deck further lowers toward the trailer bed, and said locking assembly unlocks when said extended lip engages the trailer bed.

2. The dock leveler of claim 1, and wherein said hinged rear end of said actuation bar is spaced a vertical distance below said rear hinged end of said deck, and said actuation bar is angled toward said deck when in a stored position, said front end of said actuation bar drawing back from said front end of said deck when said deck rises toward said raised position, and said actuation bar moving toward said front end of said deck when said deck is lowering from said raised position.

3. The dock leveler of claim 2, and wherein said lock block has a front surface, and said projection moves along said bottom surface of said lock block as said deck is lowering from said raised position to said transition position, said projection aligning with said front surface of said lock block at said transition position when said lip is in said extended position.

4. The dock leveler of claim 3, and wherein said lip has substantial weight and said drive bracket spaces its said pivot point a sufficient distance from said lower surface of said deck to allow said drive rod to angle toward said deck when at said transition position, said drive rod being biased upwardly into secure engagement with said front of said lock block and said lower surface of said deck via said lip weight when at said transition position.

5. The dock leveler of claim 4, and wherein said actuation bar has an upper surface and said drive rod and projection have weight, and said projection is biased by said weight to drop into engagement with said abutment of said actuation bar at said raised position, and said projection is biased by said weight to drop down from engagement with said lock block to rest on said upper surface of said actuation bar when said lip engages the trailer bed and said lip locking assembly is unlocked.

6. The dock leveler of claim 5, and wherein said drive rod projection is formed by a roller with a roller pin projecting from said roller, and said roller pin drivingly engages said abutment and travels along said bottom surface of said lock block when said lip extension assembly is engaged to extend said lip, said roller pin releasing from said abutment of said actuation bar and said roller rollingly into locked engagement with said front surface of said lock block at said transition position to hold said lip in said extended position.

7. The dock leveler of claim 6, and wherein said roller rolls along said bottom surface of said lock block as said lip extension mechanism extends said lip to its said extended position, and said roller moves up into secure engagement with a front surface of said lock block at said transition position to hold said lip in said extended position.

8. The dock leveler of claim 3, and wherein a spring joins said actuation bar to said deck to position said actuation bar at said angle toward said deck, said spring drawing said actuation bar toward said lock block to capture said projection between said actuation rod and said bottom surface of said lock block.

9. The dock leveler of claim 3, and wherein actuation bar and drive rod are in a slightly angled, substantial linear alignment when extending said lip to its said extended position.

10. The dock leveler of claim 9, and wherein actuation bar and drive rod are at angles of about 15° and 5° respectively relative to said deck and bottom surface of said lock block as said projection moves along said lock block to extend said lip.

11. The dock leveler of claim 5, and wherein said lip is substantially flush with said deck when in said extended position, and said lip is movable between said extended and pendant positions when said lip extension assembly is in said disengaged position and said locking assembly is in said unlocked position.

12. The dock leveler of claim 3, and further including a lip unlocking mechanism having an unlock block secured to said lower surface of said deck between said lock block and said front end of said deck, said front end of said actuation bar engaging said unlock block to push said drive rod down and out of said secure engagement with said lock block when said deck is raised to a predetermined raised position.

13. The dock leveler of claim 3, and further including a lip unlocking mechanism formed by lever pinned to said unlock block, said lever having a hockey stick shape with a downwardly extending handle and a foot with a plate, said handle engaging a frame abutment when said deck is lowered to a predetermined unlock position, said handle and said plate pivoting when said deck is lowered beyond said unlock position, said pivoting causing said plate to push said drive rod out of said secure engagement with said lock block.

14. The dock leveler of claim 3, and further including a mounting frame, said first end of said deck assembly being pivotally secured to said mounting frame, and said actuation bar being pivotally secured to said mounting frame.

* * * * *